US012606167B2

(12) United States Patent
  Hotta et al.

(10) Patent No.:  US 12,606,167 B2
(45) Date of Patent:  Apr. 21, 2026

(54) VEHICLE CONTROL SYSTEM, VEHICLE CONTROL METHOD. AND NON-TRANSITORY COMPUTER-READABLE RECORDING MEDIUM

(71) Applicant: TOYOTA JIDOSHA KABUSHIKI KAISHA, Toyota (JP)

(72) Inventors: Daichi Hotta, Tokyo (JP); Yusuke Hayashi, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/113,172

(22) Filed: Feb. 23, 2023

(65) Prior Publication Data
   US 2023/0311884 A1      Oct. 5, 2023

(30) Foreign Application Priority Data
   Mar. 29, 2022    (JP) ................................. 2022-053933

(51) Int. Cl.
   *B60W 30/18*      (2012.01)
   *G05D 1/00*       (2024.01)
   *G06V 20/58*      (2022.01)
(52) U.S. Cl.
   CPC ..... *B60W 30/18154* (2013.01); *G05D 1/0011* (2013.01); *G06V 20/584* (2022.01);
   (Continued)

(58) Field of Classification Search
   CPC ..... B60W 30/18154; B60W 30/18159; B60W 2554/4041; B60W 2554/4042;
   (Continued)

(56) References Cited

U.S. PATENT DOCUMENTS

2015/0248131 A1* 9/2015 Fairfield .............. G05D 1/0038
                                                      701/2
2020/0026284 A1   1/2020 Hiramatsu
                   (Continued)

FOREIGN PATENT DOCUMENTS

JP     2021033614 A    3/2021
WO     2018055731 A1   3/2018
WO     2019146052 A1   8/2019

*Primary Examiner* — Navid Z. Mehdizadeh
*Assistant Examiner* — Caitlin R McCleary
(74) *Attorney, Agent, or Firm* — Dinsmore & Shohl LLP

(57) ABSTRACT

A vehicle control system controls a vehicle that potentially requests remote support in a predetermined area. The vehicle control system acquires surrounding situation information including at least one of object information regarding an object around the vehicle and signal indication information indicating signal indication around the vehicle. The vehicle control system determines whether or not an exit passable condition is satisfied based on the surrounding situation information, the exit passable condition being a condition under which the vehicle is able to pass through a target exit from the predetermined area without waiting. When the exit passable condition is not satisfied, the vehicle control system withholds requesting the remote support in the predetermined area until a lifting condition is satisfied.

13 Claims, 19 Drawing Sheets

1: REMOTE SUPPORT SYSTEM

(52) U.S. Cl.
CPC ............... *B60W 2554/4041* (2020.02); *B60W 2554/4042* (2020.02); *B60W 2555/60* (2020.02); *B60W 2556/45* (2020.02)

(58) Field of Classification Search
CPC ......... B60W 2555/60; B60W 2556/45; B60W 50/00; B60W 10/04; B60W 10/18; B60W 10/20; B60W 2050/0064; B60W 2520/06; B60W 2520/10; B60W 2520/105; B60W 2520/14; B60W 2554/20; B60W 2554/40; B60W 2556/40; B60W 2756/10; G05D 1/0011; G05D 1/0027; G06V 20/584
See application file for complete search history.

(56) References Cited

U.S. PATENT DOCUMENTS

| | | | |
|---|---|---|---|
| 2020/0108826 A1* | 4/2020 | Kim | B60W 30/18159 |
| 2020/0211378 A1* | 7/2020 | Umehara | G08G 1/087 |
| 2020/0310417 A1* | 10/2020 | Pedersen | G05D 1/0038 |
| 2020/0361488 A1 | 11/2020 | Miura | |
| 2021/0055741 A1 | 2/2021 | Kawanai | |
| 2021/0303882 A1* | 9/2021 | Mallela | B60W 30/12 |

* cited by examiner

1: REMOTE SUPPORT SYSTEM

120

121 VEHICLE STATE SENSOR

122 POSITION SENSOR

123 RECOGNITION SENSOR

150 CONTROL DEVICE

160 PROCESSOR

170 MEMORY DEVICE

180 DRIVING ENVIRONMENT INFORMATION

MAP MAP INFORMATION

PROG VEHICLE CONTROL PROGRAM

130 TRAVEL DEVICE

140 COMMUNICATION DEVICE

110: VEHICLE CONTROL SYSTEM

180

DRIVING ENVIRONMENT INFORMATION

181

VEHICLE STATE INFORMATION

182

VEHICLE POSITION INFORMATION

183

SURROUNDING SITUATION INFORMATION

IMG

IMAGE

184

OBJECT INFORMATION

185

MOVING OBJECT
INFORMATION

186

SIGNAL INDICATION INFORMATION

| | INTRA-AREA INTERFERENCE | |
|---|---|---|
| | NO | YES |
| EXIT PASSABLE | CONTINUE AUTOMATED DRIVING WITHOUT ISSUING SUPPORT REQUEST | SUPPORT REQUEST |
| EXIT IMPASSABLE | WITHHOLD SUPPORT REQUEST | |

*FIG. 17*

VEHICLE CONTROL SYSTEM, VEHICLE CONTROL METHOD, AND NON-TRANSITORY COMPUTER-READABLE RECORDING MEDIUM

CROSS-REFERENCE TO RELATED APPLICATION

This application claims priority to Japanese Patent Application No. 2022-053933 filed on Mar. 29, 2022, the entire contents of which are incorporated by reference herein.

BACKGROUND

Technical Field

The present disclosure relates to a technique for controlling a vehicle that potentially requests remote support in a predetermined area.

Background Art

Patent Literature 1 discloses an automated driving system that controls travel of an automated driving vehicle based on a remote instruction from a remote commander. The automated driving system recognizes an external environment of the automated driving vehicle based on a result of detection by an in-vehicle sensor. The automated driving system determines whether or not to request a remote instruction from the remote commander based on the external environment. For example, the automated driving system determines whether another vehicle is present on a lane intersecting with a target route of the automated driving vehicle. When another vehicle is present on a lane intersecting with the target route of the automated driving vehicle, the automated driving system does not request the remote commander to issue a remote instruction.

LIST OF RELATED ART

Patent Literature 1: Japanese Laid-Open Patent Application No. JP-2021-33614

SUMMARY

A vehicle that is a target of remote support by a remote operator is considered. In particular, a vehicle that potentially requests remote support from a remote operator in a predetermined area such as an intersection is considered.

A remote operator is assigned to the vehicle requesting the remote support. However, even if a remote operator is assigned, there may be a situation where the remote operator is not able to issue any instruction. For example, when there is a traffic congestion in the vicinity of an exit from the predetermined area to the outside, it is better not to start the vehicle. In that case, the remote operator assigned to the vehicle has no choice but to wait without issuing any instruction. This means that a binding time of the remote operator becomes unnecessarily long. The binding time of the remote operator being unnecessarily long may not be desirable from a viewpoint of an operation of the remote support.

An object of the present disclosure is to provide a technique capable of suppressing that a remote operator is unnecessarily bound by remote support of a vehicle in a predetermined area.

A first aspect is directed to a vehicle control system for controlling a vehicle that potentially requests remote support in a predetermined area.

The vehicle control system includes one or more processors.

The one or more processors acquire surrounding situation information including at least one of object information regarding an object around the vehicle and signal indication information indicating signal indication around the vehicle.

The one or more processors determine whether or not an exit passable condition is satisfied based on the surrounding situation information, the exit passable condition being a condition under which the vehicle is able to pass through a target exit from the predetermined area without waiting.

When the exit passable condition is not satisfied, the one or more processors withhold requesting the remote support in the predetermined area until a lifting condition is satisfied.

A second aspect is directed to a vehicle control method for controlling a vehicle that potentially requests remote support in a predetermined area.

The vehicle control method includes:

acquiring surrounding situation information including at least one of object information regarding an object around the vehicle and signal indication information indicating signal indication around the vehicle;

determining whether or not an exit passable condition is satisfied based on the surrounding situation information, the exit passable condition being a condition under which the vehicle is able to pass through a target exit from the predetermined area without waiting; and when the exit passable condition is not satisfied, withholding requesting the remote support in the predetermined area until a lifting condition is satisfied.

A third aspect is directed to a vehicle control program for controlling a vehicle that potentially requests remote support in a predetermined area.

The vehicle control program is executed by a computer.

The vehicle control program causes the computer to execute:

acquiring surrounding situation information including at least one of object information regarding an object around the vehicle and signal indication information indicating signal indication around the vehicle;

determining whether or not an exit passable condition is satisfied based on the surrounding situation information, the exit passable condition being a condition under which the vehicle is able to pass through a target exit from the predetermined area without waiting; and when the exit passable condition is not satisfied, withholding requesting the remote support in the predetermined area until a lifting condition is satisfied.

According to the present disclosure, it is determined whether or not the "exit passable condition" under which the vehicle is able to pass through the target exit from the predetermined area without waiting is satisfied. When the exit passable condition is not satisfied, requesting the remote support in the predetermined area is withheld. This prevents a remote operator from being unnecessarily assigned to the vehicle. In other words, a binding time of the remote operator is prevented from becoming unnecessarily long. This may be desirable from a viewpoint of an operation of the remote support.

BRIEF DESCRIPTION OF DRAWINGS

FIG. 17 is a diagram summarizing processing related to support request in a predetermined area according to an embodiment;

EMBODIMENTS

Embodiments of the present disclosure will be described with reference to the accompanying drawings.

1. Overview of Remote Support System

Figure 1:
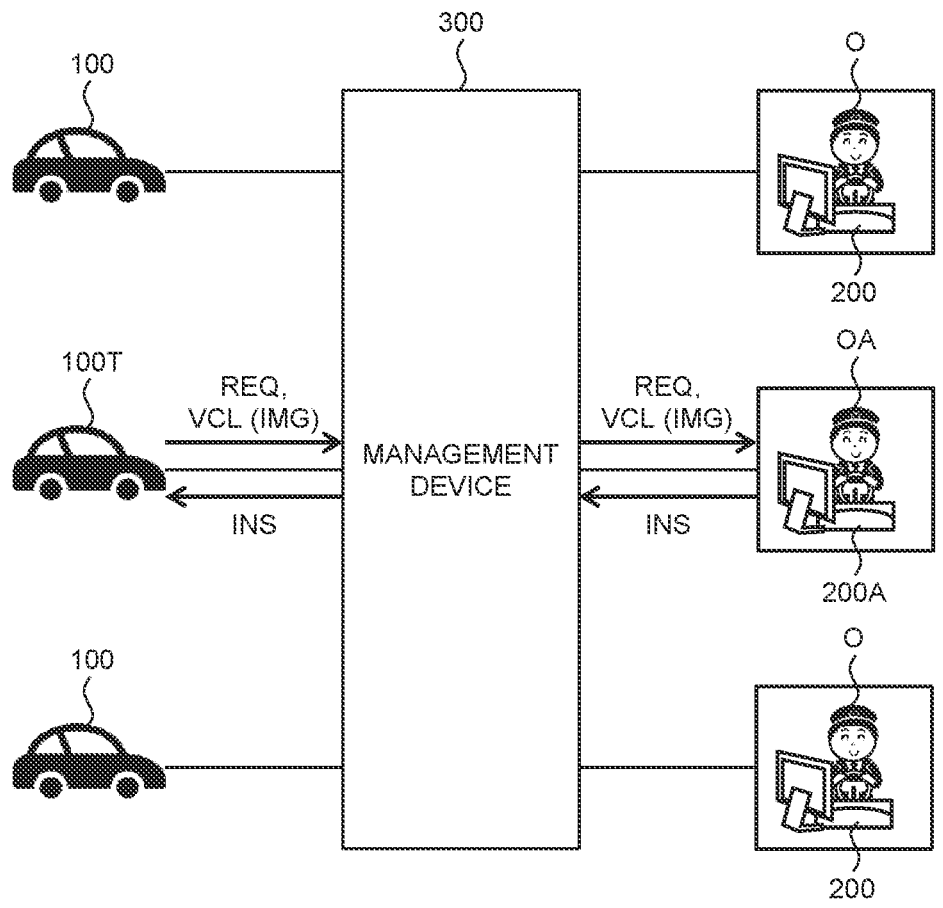
FIG. 1 is a schematic diagram showing an overview of a remote support system according to an embodiment.

FIG. 1 is a schematic diagram showing an overview of a remote support system 1 according to the present embodiment. The remote support system 1 includes a vehicle 100, a remote operator terminal 200, and a management device 300. The vehicle 100, the remote operator terminal 200, and the management device 300 can communicate with each other via a communication network.

The vehicle 100 is a target of remote support. Typically, the vehicle 100 is capable of automated (autonomous)

driving. The automated driving supposed here is one where a driver may not necessarily 100% concentrate on the driving (e.g., so-called Level 3 or higher level automated driving). The vehicle 100 may be an automated driving vehicle of Level 4 or higher that does not need a driver. A variety of sensors including a camera are installed on the vehicle 100. The camera captures a situation around the vehicle 100 to acquire an image IMG indicating the situation around the vehicle 100. The vehicle 100 performs the automated driving by using the variety of sensors.

The remote operator terminal 200 is a terminal device used by a remote operator O for performing the remote support for the vehicle 100. The remote operator terminal 200 may also be referred to as a remote support HMI (Human Machine Interface).

The management device 300 manages the remote support. The management of the remote support includes, for example, assigning a remote operator O to a vehicle 100 that receives the remote support. The management device 300 is able to communicate with the vehicle 100 and the remote operator terminal 200 via the communication network. Typically, the management device 300 is a management server on a cloud. The management server may be configured by a plurality of servers that perform distributed processing.

During the automated driving, the vehicle 100 executes a variety of vehicular processes. Examples of typical vehicular processes executed during the automated driving are as follows.

(1) Recognition process: the vehicle 100 recognizes a situation around the vehicle 100 by using a recognition sensor. For example, the vehicle 100 uses the camera to recognize signal indication of a traffic signal (e.g., green light, yellow light, red light, right-turn, etc.).

(2) Action decision process: the vehicle 100 decides, based on a result of the recognition process, whether or not to execute an action. Examples of the action include start, stop, right turn, left turn, lane change, and the like.

(3) Timing decision process: the vehicle 100 decides an execution timing at which the action is executed.

Figure 2:
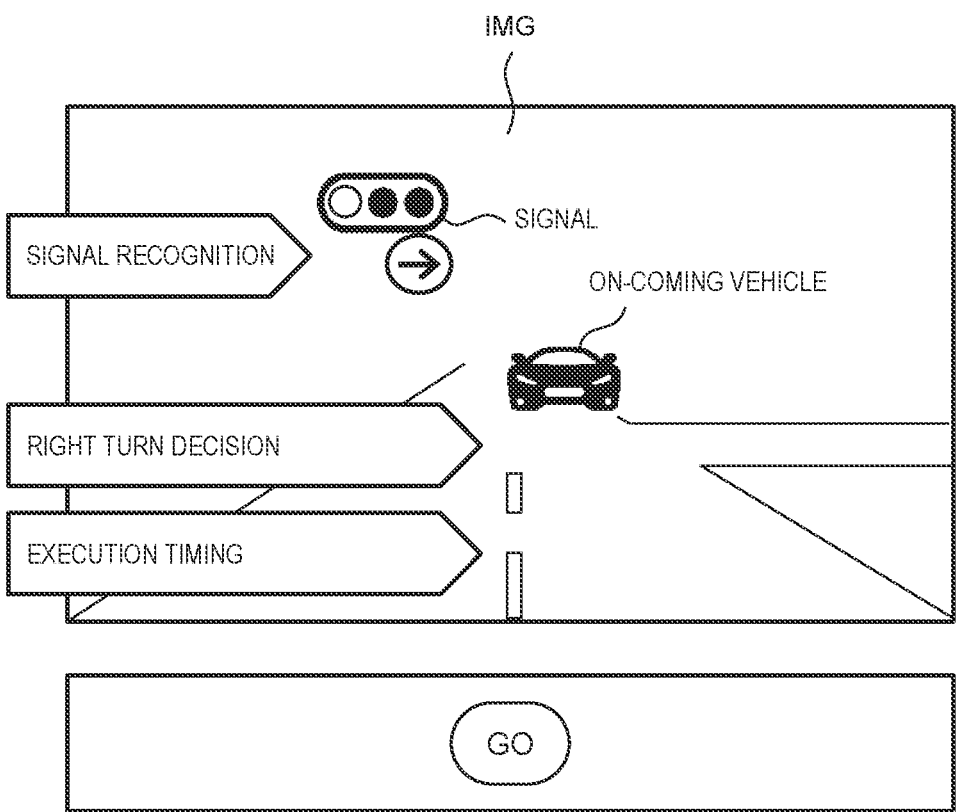
FIG. 2 is a conceptual diagram for explaining remote support by a remote operator according to an embodiment.

Typically, a situation where the remote support by the remote operator O is desired is a situation where the automated driving is difficult. For example, the remote support may be desired at an intersection as shown in FIG. 2.

For example, when a traffic signal installed at the intersection is exposed to sunlight, accuracy of recognition of the signal indication may be deteriorated. If it is not possible to accurately determine the signal indication by the recognition process, the vehicle 100 may receive the remote support for the signal recognition. Moreover, if it is not possible to determine the signal indication, it is also difficult to decide what action to take at what timing. Therefore, the vehicle 100 may receive the remote support for the action decision process and the timing decision process.

Even when the signal indication is determined, a situation where it is difficult to decide whether or not to actually execute an action is conceivable. For example, there is a possibility that an oncoming vehicle enters the intersection or an oncoming vehicle or a preceding vehicle stays within the intersection even after the signal indication as seen from the vehicle 100 becomes "right-turn OK." In that case, the vehicle 100 may request the remote support for the action decision process and the timing decision process while being stopped.

As yet another example, a situation where a road work zone exists ahead of the vehicle 100 and it is difficult to decide whether or not to make a lane change is also conceivable. In this case, the vehicle 100 may request the remote support for the action decision process.

When it is determined that the remote support is desired, the vehicle 100 requests the remote support by a remote operator O. More specifically, the vehicle 100 transmits a "support request REQ" to the management device 300. The vehicle 100 that issues the support request REQ, that is, the vehicle 100 that receives the remote support is hereinafter referred to as a "target vehicle 100T."

In response to the support request REQ from the target vehicle 100T, the management device 300 assigns any remote operator O to the target vehicle 100T. This process is hereinafter referred to as an "operator assignment process." An "assigned operator OA" is the remote operator O assigned to the target vehicle 100T. An "assigned operator terminal 200A" is the remote operator terminal 200 operated by the assigned operator OA. The management device 300 manages the target vehicle 100T and the assigned operator OA (the assigned operator terminal 200A) while associating them with each other.

The management device 300 transmits an assignment notification including information on the support request REQ and the target vehicle 100T to the assigned operator terminal 200A. The assigned operator terminal 200A presents the assignment notification to the assigned operator OA. The assigned operator OA recognizes that he or she is assigned to the target vehicle 100T, and starts the remote support for the target vehicle 100T.

During the remote support, the target vehicle 100T and the assigned operator terminal 200A communicate with each other. The target vehicle 100T transmits vehicle information VCL to the assigned operator terminal 200A. The vehicle information VCL includes a state of the vehicle 100, the image IMG around the vehicle 100 captured by the camera, results of the vehicular processes, and the like. The assigned operator terminal 200A presents the vehicle information VCL received from the target vehicle 100T to the assigned operator OA. For example, as shown in FIG. 2, the assigned operator terminal 200A displays the image IMG captured by the camera installed on the target vehicle 100T on a display device.

The assigned operator OA recognizes the situation around the target vehicle 100T by referring to the vehicle information VCL, and performs the remote support for the target vehicle 100T. For example, the remote support supports at least one of the recognition process, the action decision process, and the timing decision process described above. An operator instruction INS is an instruction to the target vehicle 100T and is input by the assigned operator OA. For example, the operator instruction INS instructs the target vehicle 100T to start moving. The assigned operator terminal 200A receives input of the operator instruction INS from the assigned operator OA, and transmits the input operator instruction INS to the target vehicle 100T. The target vehicle 100T receives the operator instruction INS from the assigned operator terminal 200A and performs vehicle control in accordance with the received operator instruction INS.

In this manner, the remote support for the vehicle 100 by the remote operator O is realized.

2. Vehicle Control System

Hereinafter, a vehicle control system 110 applied to the vehicle 100 according to the present embodiment will be described. The vehicle control system 110 controls the vehicle 100. Typically, the vehicle control system 110 is installed on the vehicle 100. Alternatively, at least a part of the vehicle control system 110 may be included in an external system to remotely control the vehicle 100. That is, the vehicle control system 110 may be distributed to the vehicle 100 and the external system.

2-1. Configuration Example

Figure 3:
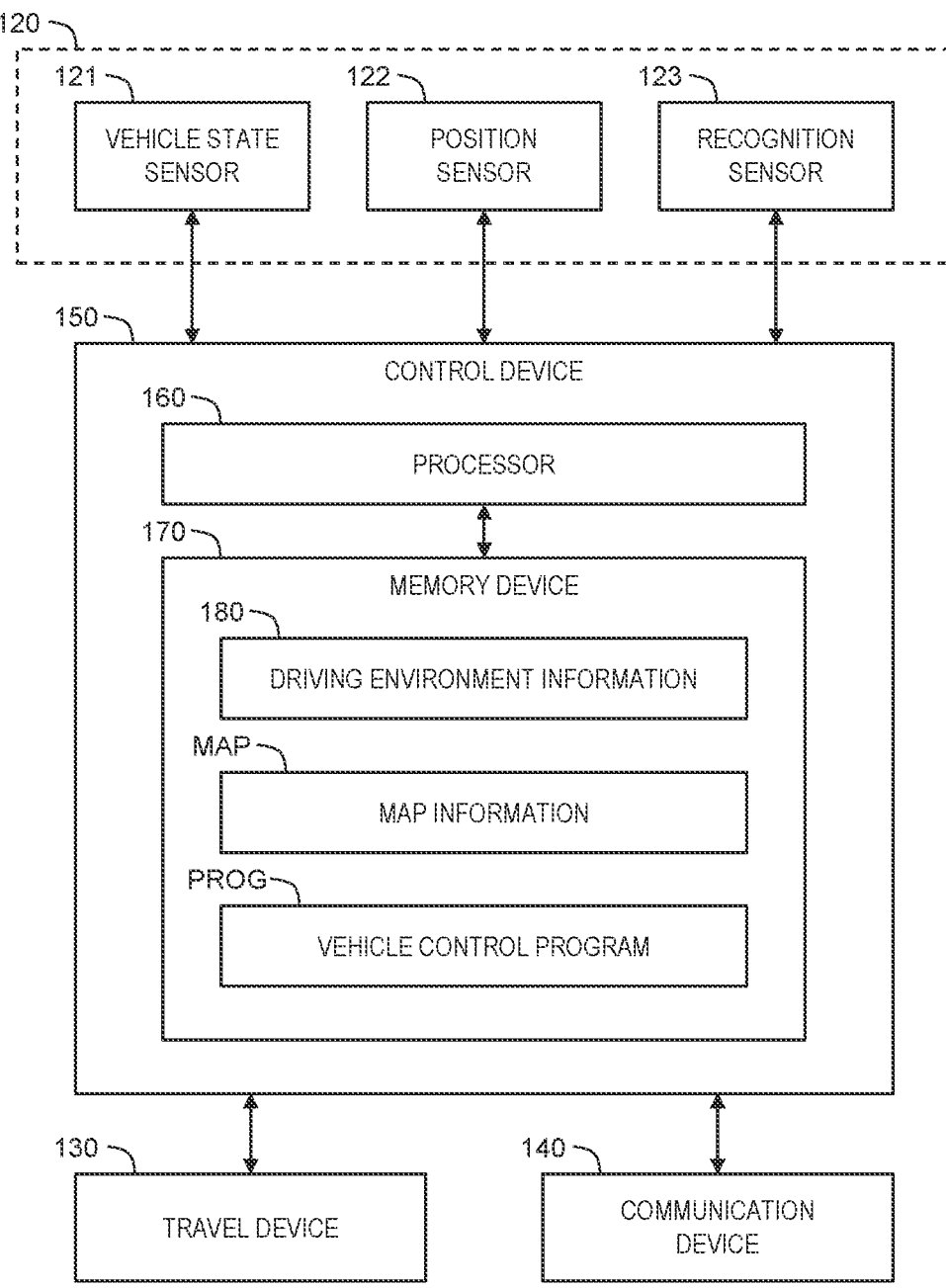
FIG. 3 is a block diagram showing a configuration example of a vehicle control system according to an embodiment.

FIG. 3 is a block diagram showing a configuration example of the vehicle control system 110 according to the present embodiment. The vehicle control system 110 includes a sensor group 120, a travel device 130, a communication device 140, and a control device 150.

The sensor group 120 is installed on the vehicle 100. The sensor group 120 includes a vehicle state sensor 121, a position sensor 122, a recognition sensor 123, and the like.

The vehicle state sensor 121 detects a state of the vehicle 100. For example, the vehicle state sensor 121 includes a speed sensor, an acceleration sensor, a yaw rate sensor, a steering angle sensor, and the like.

The position sensor 122 detects a position and an orientation of the vehicle 100. For example, the position sensor 122 includes a global navigation satellite system (GNSS).

The recognition sensor 123 recognizes (detects) a situation around the vehicle 100. The recognition sensor 123 includes a camera. The recognition sensor 123 may include a laser imaging detection and ranging (LIDAR), a radar, and the like.

The travel device 130 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force.

The communication device 140 communicates with the outside of the vehicle 100. For example, the communication device 140 communicates with the remote operator terminal 200 and the management device 300. As another example, the communication device 140 may communicate with a map management system that manages map information. As still another example, the communication device 140 may communicate with an automated driving management system that manages automated driving of the vehicle 100. As still another example, the communication device 140 may communicate with a traffic signal management system that manages traffic signals. As still another example, the communication device 140 may perform vehicle-to-infrastructure (V2I) communication or vehicle-to-vehicle (V2V) communication.

The control device (controller) 150 controls the vehicle 100. The control device 150 includes one or more processors 160 (hereinafter, simply referred to as a processor 160) and one or more memory device 170 (hereinafter, simply referred to as a memory device 170). The processor 160 executes a variety of processing. For example, the processor 160 includes a central processing unit (CPU). The memory device 170 stores a variety of information. Examples of the memory device 170 include a volatile memory, a nonvolatile memory, a hard disk drive (HDD), a solid state drive (SSD), and the like. The control device 150 may include one or more electronic control units (ECUs). A part of the control device 150 may be an information processing device outside the vehicle 100. In that case, the part of the control device 150 communicates with the vehicle 100 and remotely controls the vehicle 100.

A vehicle control program PROG is a computer program for controlling the vehicle 100. A variety of processing by the control device 150 can be implemented by the processor 160 executing the vehicle control program PROG. The vehicle control program PROG is stored in the memory device 170. Alternatively, the vehicle control program PROG may be recorded on a non-transitory computer-readable recording medium.

Map information MAP includes a general navigation map. The map information MAP may indicate a lane configuration and a road shape. The map information MAP may include position information of landmarks, traffic signals, and signs. The map information may include information regarding a predetermined area in which the vehicle 100 potentially requests the remote support. The control device 150 acquires the map information MAP of an area from a map database. The map database may be stored in the memory device 170, or may be stored in the map management system outside the vehicle 100. In the latter case, the control device 150 communicates with the map management system via the communication device 140 to acquire the map information MAP. The map information MAP is stored in the memory device 170.

2-2. Driving Environment Information

The control device 150 uses the sensor group 120 to acquire driving environment information 180 indicating a driving environment for the vehicle 100. The driving environment information 180 is stored in the memory device 170.

Figure 4:
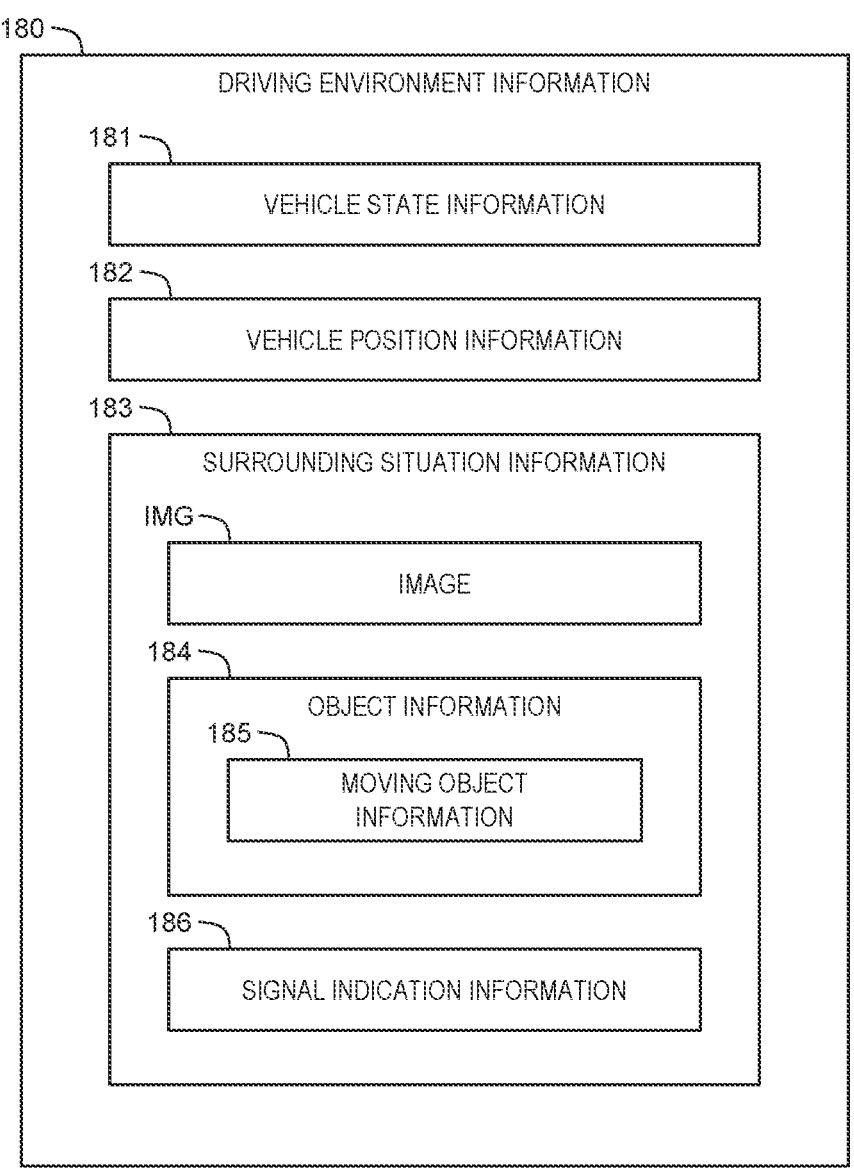
FIG. 4 is a block diagram showing an example of driving environment information according to an embodiment.

FIG. 4 is a block diagram showing an example of the driving environment information 180. The driving environment information 180 includes vehicle state information 181, vehicle position information 182, and surrounding situation information 183.

The vehicle state information 181 is information indicating the state of the vehicle 100, and includes the vehicle speed, the acceleration, the yaw rate, the steering angle, and the like. The control device 150 acquires the vehicle state information 181 from the vehicle state sensor 121.

The vehicle position information 182 indicates the position and the orientation of the vehicle 100. The control device 150 acquires the vehicle position information 182 from the position sensor 122. In addition, the control device 150 may acquire highly accurate vehicle position information 182 by performing a well-known self-position estimation process (localization) using the map information MAP and object information 184 described below.

The surrounding situation information 183 indicates a result of recognition by the recognition sensor 123, that is, the situation around the vehicle 100. For example, the surrounding situation information 183 includes an image IMG showing the situation around the vehicle 100 captured by the camera. As another example, the surrounding situation information 183 may include point cloud information acquired by the LIDAR.

The surrounding situation information 183 may further include object information 184 regarding an object around the vehicle 100. Examples of the object include a moving object, a white line, a pedestrian crossing, a traffic signal, a sign, a landmark, an obstacle, and the like. Examples of the moving object include a pedestrian, a bicycle, a motor bike, and another vehicle (e.g., a preceding vehicle, a parked vehicle). The object information 184 indicates a relative position and a relative speed of the object with respect to the vehicle 100. For example, analyzing the image IMG captured by the camera makes it possible to identify an object and calculate a relative position of the object. For example, the control device 150 identifies an object such as a traffic signal in the image IMG by using image recognition AI acquired by machine learning. It is also possible to identify an object and acquire a relative position and a relative speed of the object based on the point group information acquired by the LIDAR. Moving object information 185 indicates the relative position and the relative speed of the moving object. The moving object information 185 may indicate a type of the moving object. The moving object information 185 may indicate a direction of movement of the moving object.

The surrounding situation information 183 may further include signal indication information 186. The signal indication information 186 indicates signal indication (lighting state) of a traffic signal around the vehicle 100. Examples of the signal indication include a green light, a yellow light, a red light, a right-turn signal, a blinking signal, and the like. For example, the control device 150 is able to recognize the traffic signal around the vehicle 100 and its signal indication based on the image IMG captured by the camera. As another example, information on the signal indication of the traffic signal around the vehicle 100 may be provided from the traffic signal management system or the traffic signal itself. In that case, the control device 150 communicates with the traffic signal management system or the traffic signal via the communication device 140 to acquire the information on the signal indication. The information provided from the traffic signal management system or the traffic signal may include a remaining time of the signal indication (e.g., green light). That is, the signal indication information 186 may include the current signal indication and the remaining time of the signal indication.

2-3. Vehicle Travel Control

The control device 150 executes "vehicle travel control" that controls travel of the vehicle 100. The vehicle travel control includes steering control, acceleration control, and deceleration control. The control device 150 executes the vehicle travel control by controlling the travel device 130. More specifically, the control device 150 executes the steering control by controlling the steering device. The control device 150 executes the acceleration control by controlling the driving device. Further, the control device 150 executes the deceleration control by controlling the braking device.

2-4. Automated Driving Control

The control device 150 executes automated driving control based on the driving environment information 180. During the automated driving, the control device 150 executes the following vehicular processes.

(1) Recognition process: the control device 150 uses the recognition sensor 123 to acquire the surrounding situation information 183.

(2) Action decision process: the control device 150 decides whether or not to execute an action based on the surrounding situation information 183. Examples of the action include start, stop, right turn, left turn, lane change, and the like.

(3) Timing decision process: the control device 150 decides an execution timing for executing the action described above.

When executing the above-described action, the control device 150 generates a target trajectory TR of the vehicle 100 based on the driving environment information 180. The target trajectory TR includes a target position and a target velocity. Then, the control device 150 executes the vehicle travel control such that the vehicle 100 follows the target trajectory TR.

2-5. Processing Related to Remote Support

Typically, a situation where the remote support by the remote operator O is provided is a situation where the automated driving is difficult. When the remote support by the remote operator O is provided, the control device 150 transmits the support request REQ to the management device 300 via the communication device 140. The control device 150 may make the vehicle 100 stop in conjunction with the transmission of the support request REQ. The support request REQ requests support of at least one of the plurality of vehicular processes (i.e., the recognition process, the action decision process, and the timing decision process) described above. The support request REQ may include a result of the vehicular processes as reference information. In response to the support request REQ, the management device 300 performs the operator assignment process described above.

Moreover, the control device 150 transmits the vehicle information VCL to the remote operator terminal 200 via the communication device 140. The vehicle information VCL is information for providing the remote support by the remote operator O, and includes at least a part of the driving environment information 180 described above. For example, the vehicle information VCL includes the surrounding situation information 183 (in particular, the image IMG). The vehicle information VCL may further include the vehicle state information 181, the vehicle position information 182, the travel plan, and the like.

Furthermore, the control device 150 receives the operator instruction INS from the remote operator terminal 200 via the communication device 140. The control device 150 executes the vehicle travel control in accordance with the received operator instruction INS.

3. Support Request Withholding Process in Predetermined Area

Figure 5:
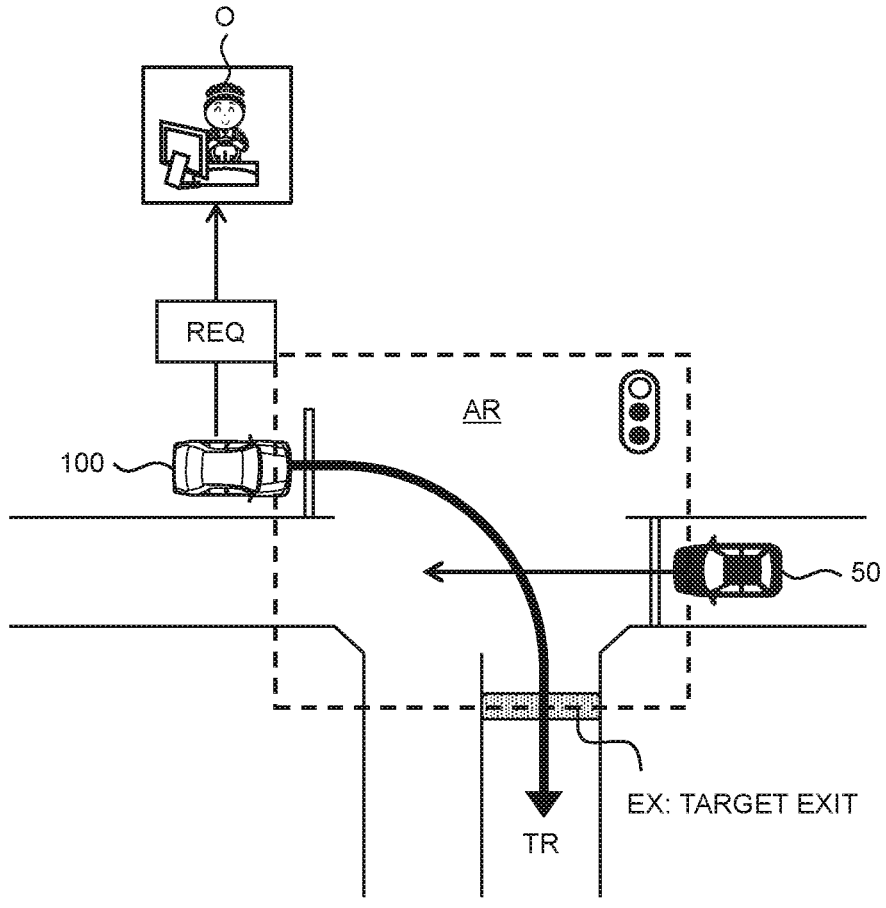
FIG. 5 is a conceptual diagram for explaining an example of a predetermined area according to an embodiment.

FIG. 5 is a conceptual diagram for explaining an example of a "predetermined area AR." The predetermined area AR is an area in which the vehicle 100 (i.e., the vehicle control system 110, the control device 150) potentially requests the remote support. In other words, the predetermined area AR is an area in which the vehicle 100 (i.e., the vehicle control system 110 and the control device 150) potentially issues the support request REQ. The predetermined area AR is registered in advance in the map information MAP. The control device 150 is able to grasp a positional relationship between the vehicle 100 and the predetermined area AR based on the vehicle position information 182 and the map information MAP.

In the example shown in FIG. 5, the predetermined area AR is an intersection. The vehicle 100 during the automated driving is scheduled to make a right turn at the intersection. The control device 150 generates the target trajectory TR that makes the vehicle 100 turn right and pass through the intersection. More specifically, a "target exit EX" from the intersection to the outside is an exit through which the vehicle 100 is scheduled to pass. That is, the vehicle 100 is scheduled to turn right at the intersection and pass through the target exit EX to go out of the intersection. The target trajectory TR is generated so as to pass through the target exit EX and extend to the outside of the intersection.

When an oncoming vehicle 50 enters the intersection, the vehicle 100 traveling in accordance with the target trajectory TR may interfere with the oncoming vehicle 50 within the intersection. Here, "interfering" means that a possibility of collision is equal to or greater than a threshold value. The control device 150 determines, based on the object information 184 (the moving object information 185), whether or not the vehicle 100 traveling in accordance with the target trajectory TR interferes with the oncoming vehicle 50. When the vehicle 100 is predicted to interfere with the oncoming vehicle 50, the control device 150 may stop the vehicle 100 and issue the support request REQ requesting the remote support. When the control device 150 issues the support request REQ, the management device 300 performs the above-described operator assignment process to assign the remote operator O to the vehicle 100 (the target vehicle 100T).

However, even if the remote operator O is assigned to the target vehicle 100T, there may be a situation where the remote operator O (i.e., the assigned operator OA) is not able to issue any instruction. For example, when there is a traffic congestion in the vicinity of the target exit EX from the intersection, it is better not to start the target vehicle 100T. In that case, the assigned operator OA has no choice but to wait without issuing any instruction. This means that a binding time of the assigned operator OA becomes unnecessarily long. The binding time of the assigned operator OA being unnecessarily long may not be desirable from a viewpoint of an operation of the remote support. For example, when the binding time of the assigned operator OA becomes unnecessarily long, operational costs increase.

In view of the above, the present embodiment proposes a technique capable of suppressing that the remote operator O is unnecessarily bound by the remote support of the vehicle 100 in the predetermined area AR.

In order to achieve the above-described object, the present embodiment introduces a concept of "exit passable condition." The exit passable condition is a condition under which the vehicle 100 is able to pass through the target exit EX from the predetermined area AR without waiting. In other words, the exit passable condition is a condition under which the vehicle 100 is able to pass through the predetermined area AR and go out of the predetermined area AR without waiting. Various examples of the exit passable condition will be described below.

In the predetermined area AR, the control device 150 determines whether or not the exit passable condition is satisfied based on the surrounding situation information 183 described above. When the exit passable condition is not satisfied, the vehicle 100 is not able to smoothly pass through the target exit EX without waiting. In this case, even if the remote operator O is assigned to the vehicle 100, the remote operator O has no choice but to wait without issuing a start instruction.

Therefore, when the exit passable condition is not satisfied, the control device 150 withholds requesting the remote support in the predetermined area AR. That is, when the exit passable condition is not satisfied, the control device 150 does not issue the support request REQ but withholds it in the predetermined area AR. This process is hereinafter referred to as a "support request withholding process." Even when the remote support is desired, the control device 150 keeps withholding the support request REQ until a lifting condition is met. Examples of the lifting condition will be described later. While the support request REQ is withheld, no remote operator O is assigned to the vehicle 100.

As described above, when the exit passable condition is not satisfied, the support request REQ is not issued and thus no remote operator O is assigned to the vehicle 100. Thus, the remote operator O is prevented from being unnecessarily assigned to the vehicle 100. In other words, the binding time of the remote operator O is prevented from becoming unnecessarily long. According to the present embodiment, as described above, it is possible to prevent the remote operator O from being unnecessarily bound by the remote support of the vehicle 100 in the predetermined area AR. That is, it is possible to more efficiently assign the remote operator O. This may be desirable from the point of view of the operation of the remote support. For example, it is possible to reduce the operational costs of the remote support.

Hereinafter, various examples of the exit passable condition according to the present embodiment will be described.

3-1. First Example

Figure 6:
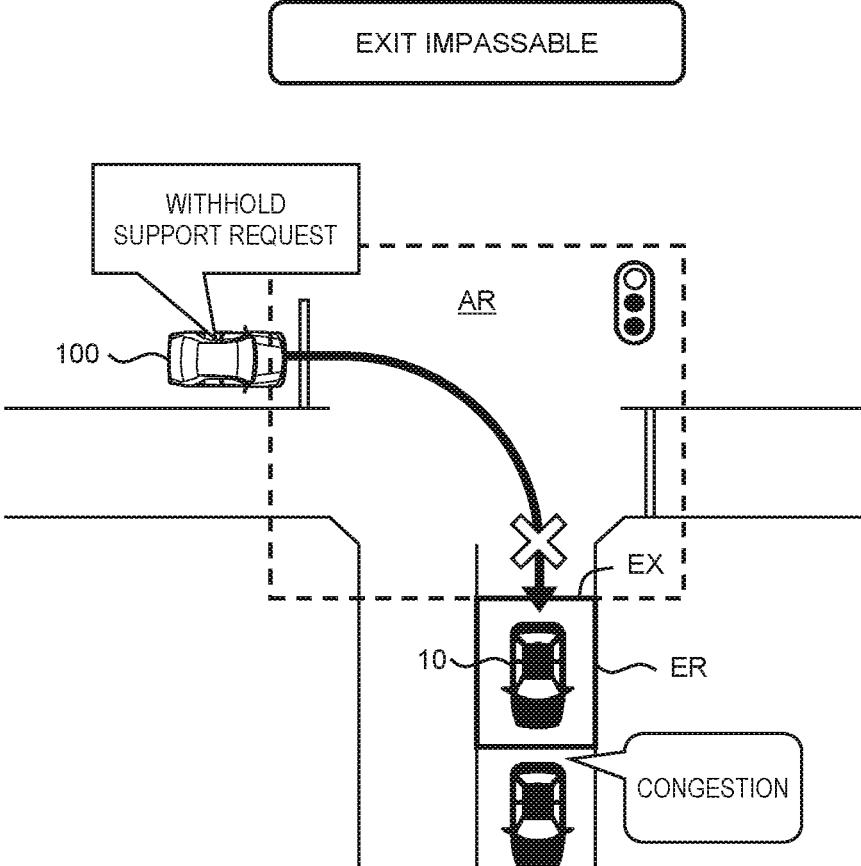
FIG. 6 is a conceptual diagram for explaining a first example of an exit passable condition according to an embodiment.
Figure 7:
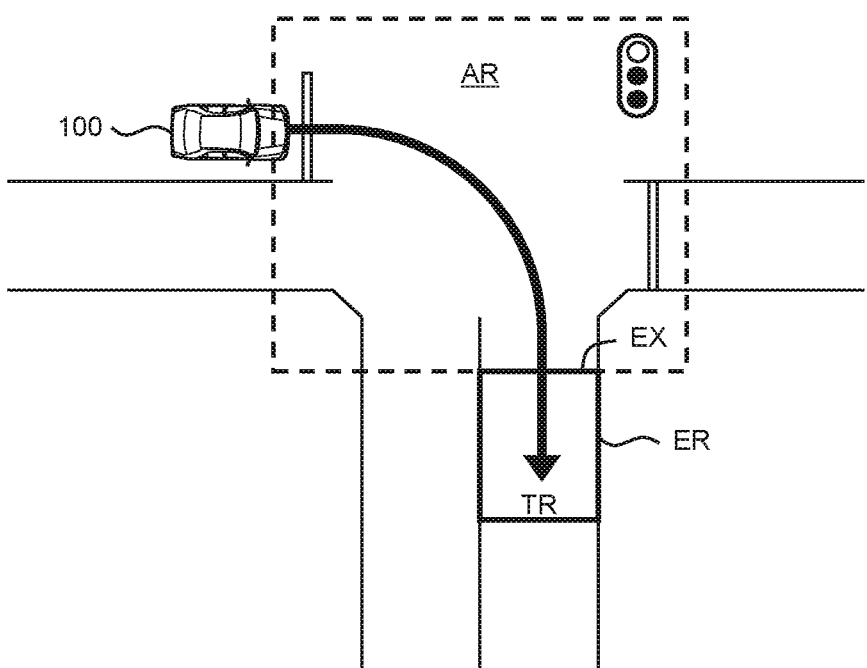
FIG. 7 is a conceptual diagram for explaining a first example of an exit passable condition according to an embodiment.

FIGS. 6 and 7 are conceptual diagrams for explaining a first example of the exit passable condition. For example, the predetermined area AR is an intersection. A "target exit area ER" is an area adjacent to the target exit EX and located outside the predetermined area AR. For example, the target exit area ER has a size that allows the entire vehicle 100 to enter.

In an example shown in FIG. 6, the vicinity of the target exit area ER is congested. There is a preceding vehicle 10 in the target exit area ER, and there is no room in the target exit area ER for the vehicle 100 to enter. That is, the vehicle 100 is not able to go out of the predetermined area AR through the target exit EX without interfering with another object.

On the other hand, in an example shown in FIG. 7, there is no preceding vehicle 10 in the target exit area ER, and the vehicle 100 is able to enter the target exit area ER. That is, the vehicle 100 is able to go out of the predetermined area AR through the target exit EX without interfering with another object.

In view of the above, the first example of the exit passable condition is that "there is no preceding vehicle 10 in the target exit area ER." The object information 184 (the moving object information 185) includes information on the preceding vehicle 10 in the target exit area ER. Therefore, the control device 150 can determine whether or not the first example of the exit passable condition is satisfied based on the object information 184 (the moving object information 185). When the preceding vehicle 10 is present in the target exit area ER and the vehicle 100 is not able to enter the target exit area ER, the control device 150 determines that the first example of the exit passable condition is not satisfied.

To generalize, it can be said that the first example of the exit passable condition is that "the vehicle 100 is able to pass through the target exit EX without interfering with another object." For convenience, this exit passable condition related to interfering is hereinafter referred to as a "first exit passable condition." The control device 150 is able to determine whether or not the first exit passable condition is satisfied based on the object information 184.

3-2. Second Example

Figure 8:
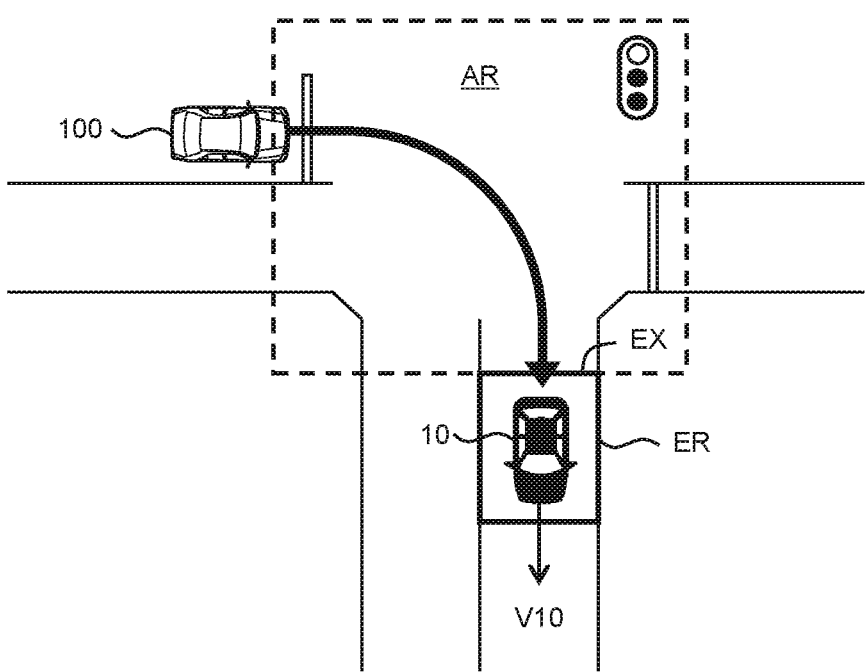
FIG. 8 is a conceptual diagram for explaining a second example of an exit passable condition according to an embodiment.

FIG. 8 is a conceptual diagram for explaining a second example of the exit passable condition. A description overlapping with the above-described first example will be omitted as appropriate.

In an example shown in FIG. 8, a preceding vehicle 10 is present in the target exit area ER. However, a speed V10 of the preceding vehicle 10 present in the target exit area ER exceeds a speed threshold Vth. In this case, the preceding vehicle 10 leaves the target exit area ER while the vehicle 100 moves within the predetermined area AR. Therefore, the vehicle 100 is able to go out of the predetermined area AR through the target exit EX without interfering with another object.

In view of the above, the second example of the exit passable condition is that "the preceding vehicle 10 is present in the target exit area ER, but the speed V10 of the preceding vehicle 10 in the target exit area ER exceeds the speed threshold Vth." The control device 150 can determine whether or not the second example of the exit passable condition is satisfied based on the object information 184 (in particular, the moving object information 185). When the speed V10 of the preceding vehicle 10 in the target exit area ER is equal to or less than the speed threshold Vth, the control device 150 determines that the second example of the exit passable condition is not satisfied.

It should be noted that the second example of the exit passable condition is also a kind of the "first exit passable condition" related to interfering.

3-3. Third Example

Figure 9:
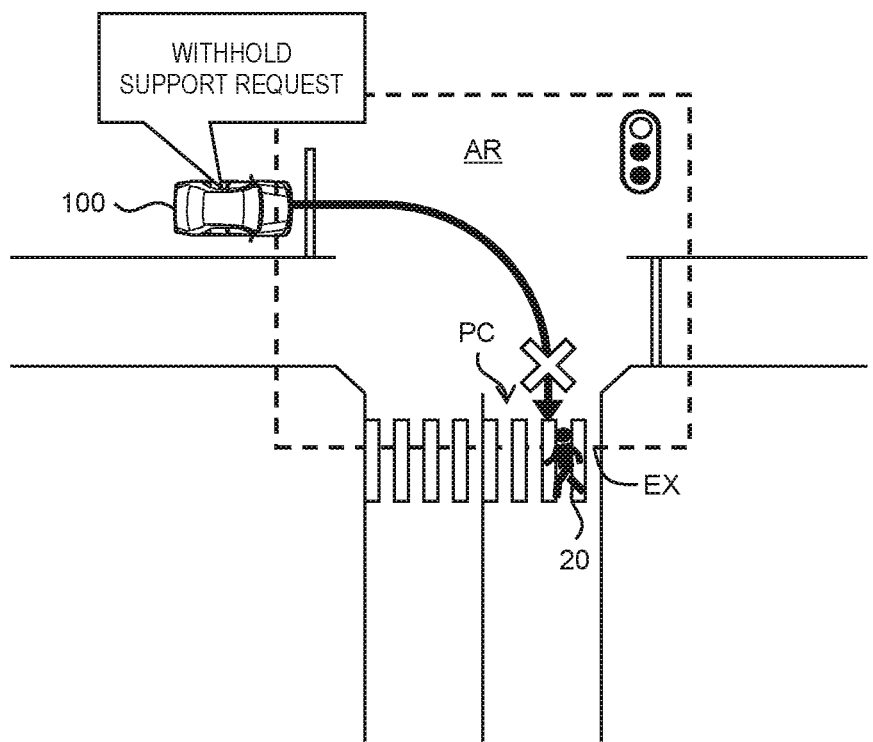
FIG. 9 is a conceptual diagram for explaining a third example of an exit passable condition according to an embodiment.
Figure 10:
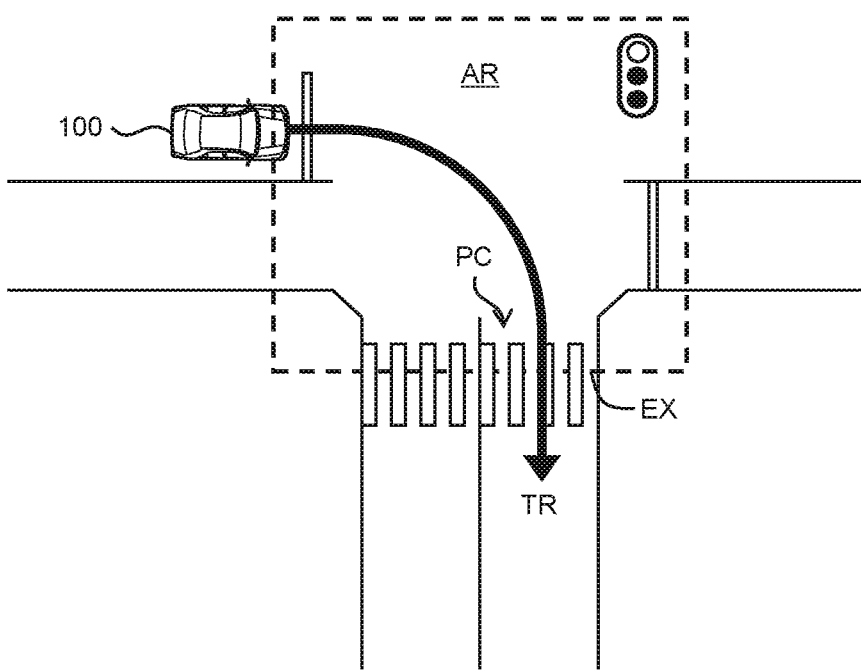
FIG. 10 is a conceptual diagram for explaining a third example of an exit passable condition according to an embodiment.
Figure 11:
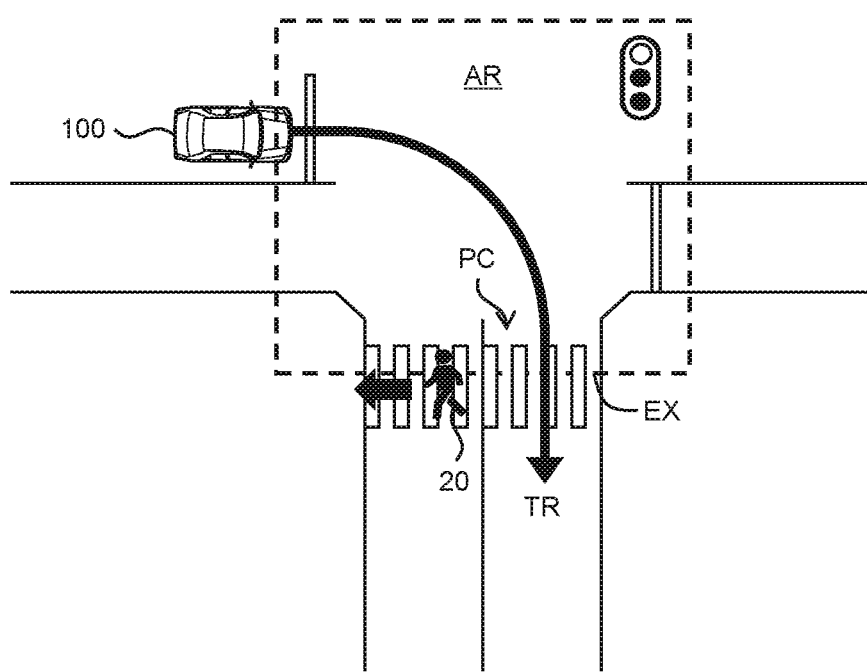
FIG. 11 is a conceptual diagram for explaining a third example of an exit passable condition according to an embodiment.

FIGS. 9 to 11 are conceptual diagrams for explaining a third example of the exit passable condition. For example, the predetermined area AR is an intersection. There is a pedestrian crossing PC near the target exit EX of the predetermined area AR.

In an example shown in FIG. 9, the pedestrian 20 is present on the pedestrian crossing PC on the target exit EX. If the vehicle 100 goes forward as it is, the vehicle 100 passing through the target exit EX is likely to interfere with the pedestrian 20 on the pedestrian crossing.

In an example shown in FIG. 10, no pedestrian 20 is present on the pedestrian crossing PC. Therefore, the vehicle 100 is able to pass through the target exit EX without interfering with any pedestrian 20.

In an example shown in FIG. 11, the pedestrian 20 is present on the pedestrian crossing PC but is not present on the pedestrian crossing PC on the target exit EX. In addition, a direction of movement of the pedestrian 20 is away from the target exit EX. In this case, the pedestrian 20 further moves away from the target exit EX while the vehicle 100 moves within the predetermined area AR. Therefore, it is expected that the vehicle 100 is able to pass through the target exit EX without interfering with the pedestrian 20.

In view of the above, the third example of the exit passable condition is that "the vehicle 100 does not interfere with a moving object on the pedestrian crossing PC when passing through the pedestrian crossing PC." Examples of the moving object include a pedestrian 20 and a bicycle. The object information 184 (the moving object information 185) includes information on the moving object on the pedestrian crossing PC. The information on the moving object includes a relative position and a relative speed of the moving object. The information on the moving object may include the direction of movement. The control device 150 can determine whether or not the third example of the exit passable condition is satisfied based on the object information 184 (the moving object information 185). When the vehicle 100 is predicted to interfere with the moving object on the pedestrian crossing PC when passing through the pedestrian crossing PC, the control device 150 determines that the third example of the exit passable condition is not satisfied.

It should be noted that the third example of the exit passable condition is also a kind of the "first exit passable condition" related to interfering.

3-4. Fourth Example

Figure 12:
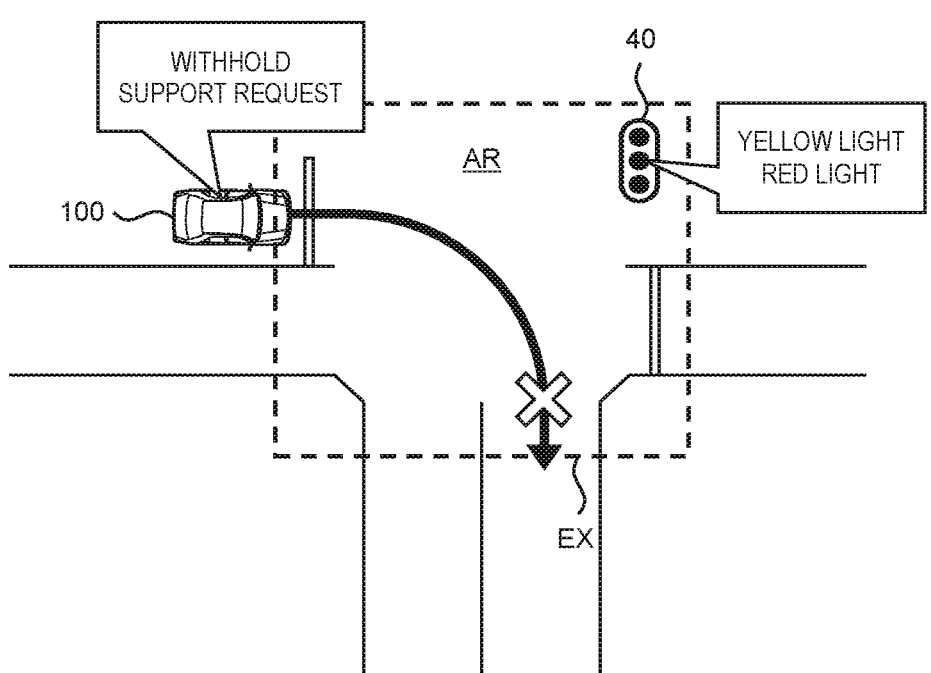
FIG. 12 is a conceptual diagram for explaining a fourth example of an exit passable condition according to an embodiment.
Figure 13:
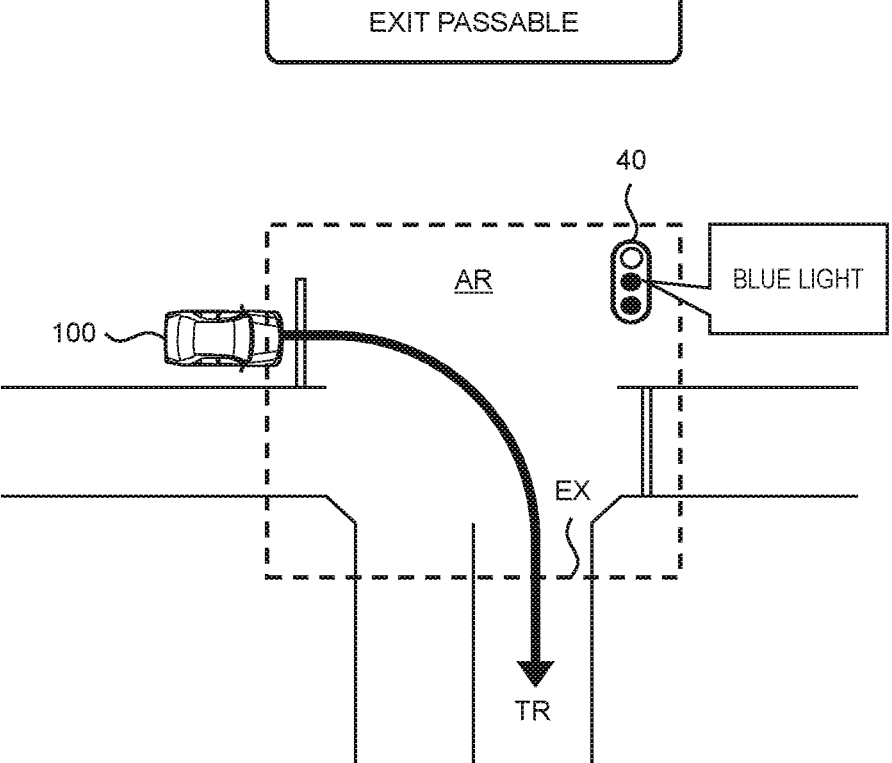
FIG. 13 is a conceptual diagram for explaining a fourth example of an exit passable condition according to an embodiment.

FIGS. 12 and 13 are conceptual diagrams for explaining a fourth example of the exit passable condition. For example, the predetermined area AR is an intersection. A traffic signal 40 to be followed by the vehicle 100 passing through the predetermined area AR is installed at the intersection.

In an example shown in FIG. 12, the signal indication of the traffic signal 40 is a red light or a yellow light. In this case, the vehicle 100 is prohibited from passing through the predetermined area AR, or the vehicle 100 should not go into the predetermined area AR.

On the other hand, in an example shown in FIG. 13, the signal indication of the traffic signal 40 is a green light. In this case, the vehicle 100 is permitted to pass through the predetermined area AR.

In view of the above, the fourth example of the exit passable condition is that "the signal indication to be followed by the vehicle 100 is a green light." The signal indication information 186 includes the signal indication of the traffic signal 40 around the vehicle 100. Therefore, the control device 150 can determine whether or not the fourth example of the exit passable condition is satisfied based on the signal indication information 186. When the signal indication to be followed by the vehicle 100 is a red light or a yellow light, the control device 150 determines that the fourth example of the exit passable condition is not satisfied.

To generalize, it can be said that the fourth example of the exit passable condition is that "the vehicle 100 is able to pass through the target exit EX in accordance with the signal indication." For convenience, this exit passable condition related to the signal indication is hereinafter referred to as a "second exit passable condition." The control device 150 can determine whether or not the second exit passable condition is satisfied based on the signal indication information 186.

3-5. Fifth Example

Figure 14:
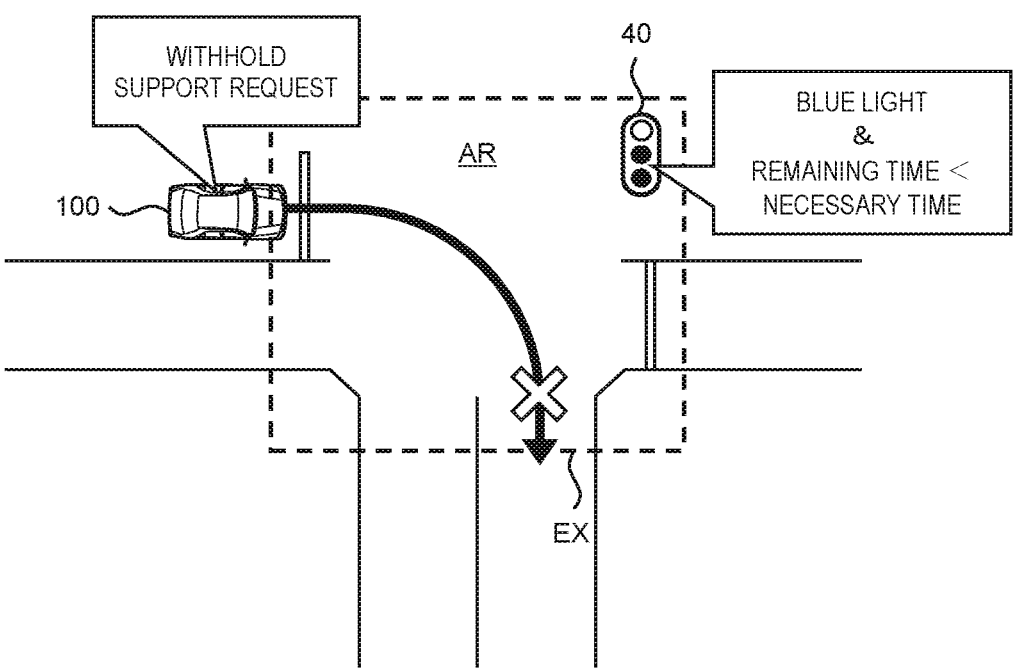
FIG. 14 is a conceptual diagram for explaining a fifth example of an exit passable condition according to an embodiment.

FIG. 14 is a conceptual diagram for explaining a fifth example of the exit passable condition. A description overlapping with the fourth example will be omitted as appropriate.

In an example shown in FIG. 14, the signal indication to be followed by vehicle 100 is a green light. However, a remaining time of the green light is shorter than a time required for the vehicle 100 to pass through the predetermined area AR and go out of the predetermined area AR. In other words, the remaining time of the green light is insufficient for the vehicle 100 to pass through the predetermined area AR. Also in this case, the vehicle 100 should not go into the predetermined area AR.

In view of the above, the fifth example of the exit passable condition is that "the signal indication to be followed by the vehicle 100 is a green light and the remaining time of the green light is equal to or longer than the time required for the vehicle 100 to go out of the predetermined area AR." The required time can be calculated based on the vehicle position information 182 and the target trajectory TR. The remaining time of the green light is obtained from the signal indication information 186. The control device 150 determines whether or not the fifth example of the exit passable condition is satisfied based on the signal indication information 186. When the remaining time of the green light is shorter than the time required for the vehicle 100 to go out of the predetermined area AR, the control device 150 determines that the fifth example of the exit passable condition is not satisfied.

It should be noted that the fifth example of the exit passable condition is also a kind of the "second exit passable condition" related to the signal indication.

3-6. Sixth Example

Let us consider a pedestrian signal for a second lane intersecting a first lane in which the vehicle 100 exists. The signal indication of the pedestrian signal is also obtained from the signal indication information 186. The control device 150 may issue the support request REQ at a timing when the signal indication of the pedestrian signal for the second lane becomes blue blinking. In this case, the remote operator O can instruct starting or the like as soon as the traffic signal 40 for the first lane changes to a green light. That is, the remote support can be performed more efficiently.

3-7. Seventh Example

Two or more of the first to sixth examples described above can be combined as long as no contradiction is caused.

3-8. Other Examples of Predetermined Area

Figure 15:
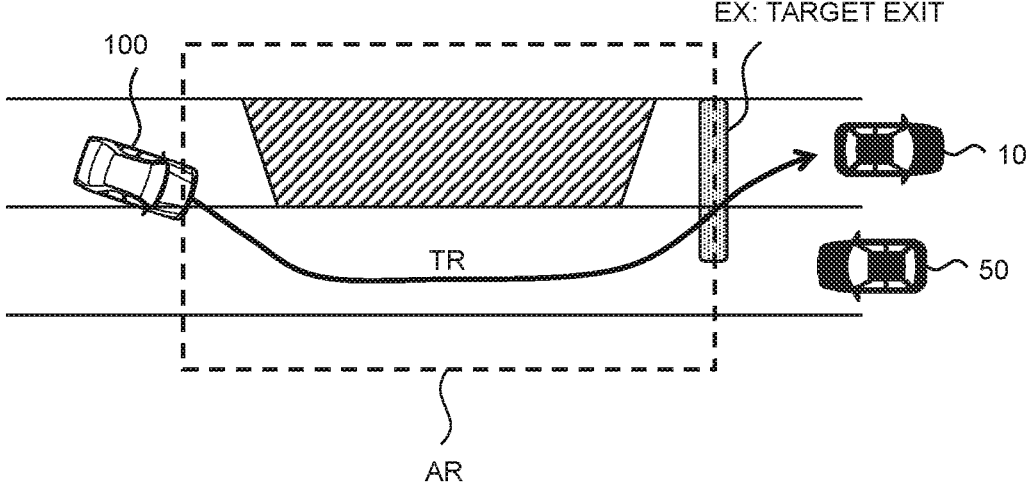
FIG. 15 is a conceptual diagram for explaining another example of a predetermined area according to an embodiment.

The predetermined area AR is not limited to the intersection. For example, as shown in FIG. 15, a road work zone may cause lane restriction (lane closure) and one-way alternating traffic. In this case, the vehicle control system 110 needs to control the vehicle 100 by recognizing a traffic signal or an instruction from a flagman. Therefore, there is a possibility that the remote support is requested in order to pass the road work zone. An area including such the road work zone is also the predetermined area AR. As shown in FIG. 15, the target exit EX can be defined also for the predetermined area AR including the road work zone. Therefore, the same points as in the above-described examples are applicable.

As still another example, the predetermined area AR may be a stop prohibited area set in front of a fire station or the like.

4. Processing Related to Support Request in Predetermined Area

Figure 16:
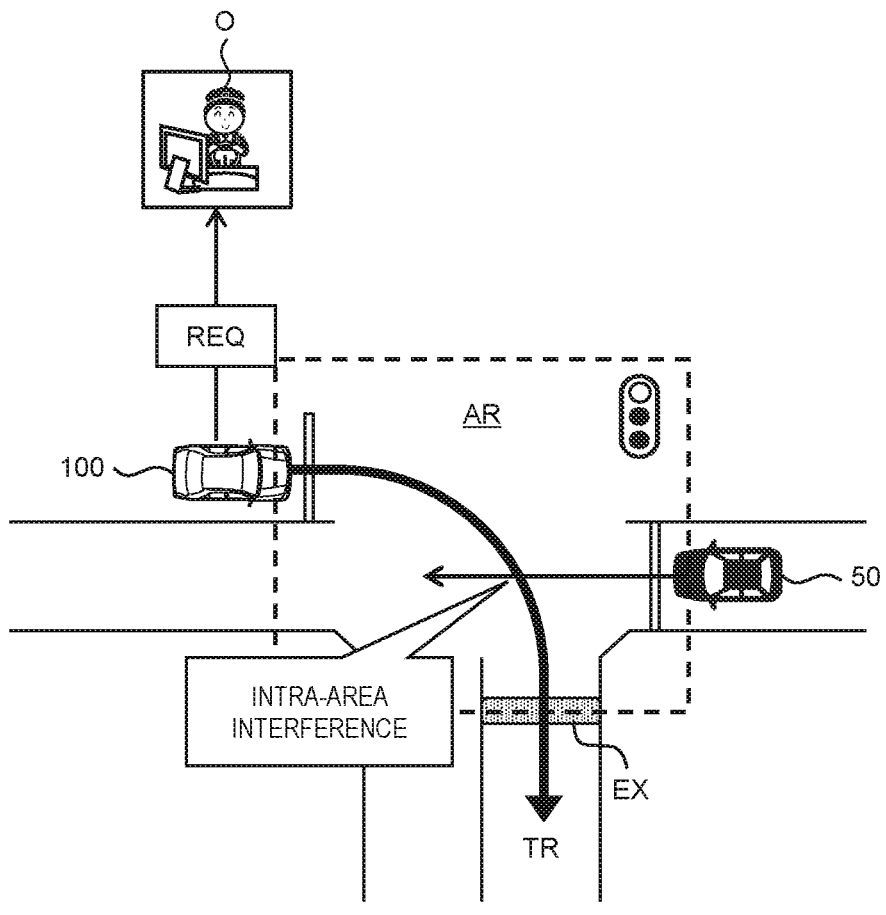
FIG. 16 is a conceptual diagram for explaining intra-area interference according to an embodiment.

FIG. 16 is a conceptual diagram for explaining "intra-area interference." The intra-area interference means that the vehicle 100 traveling in accordance with the target trajectory TR interferes with another moving object in the predetermined area AR. Here, "interfering" means that a possibility of collision is equal to or greater than a threshold value. The other moving object is typically another vehicle. In an example shown in FIG. 16, the predetermined area AR is an intersection. The vehicle 100 traveling in accordance with the target trajectory TR may interfere with an oncoming vehicle 50 within the intersection. The control device 150 can determine (predict) whether or not the intra-area interference occurs based on the object information 184.

FIG. 17 is a diagram summarizing processing related to the support request in the predetermined area AR according to the present embodiment.

First, a case where the exit passable condition is satisfied will be considered. When it is predicted that no intra-area interference occurs, the control device 150 continues the automated driving control without issuing the support request REQ. On the other hand, when the intra-area interference is predicted to occur, the control device 150 issues the support request REQ. Typically, the control device 150 makes the vehicle 100 stop in conjunction with the support request REQ. In this manner, the control device 150 determines whether to request the remote support based on presence or absence of the intra-area interference.

Next, a case where the exit passable condition is not satisfied will be considered. When the exit passable condition is not satisfied, the vehicle 100 is not able to pass through the target exit EX without waiting. In this case, the control device 150 performs the "support request withholding process" that withholds the support request REQ without issuing it in the predetermined area AR.

Figure 18:
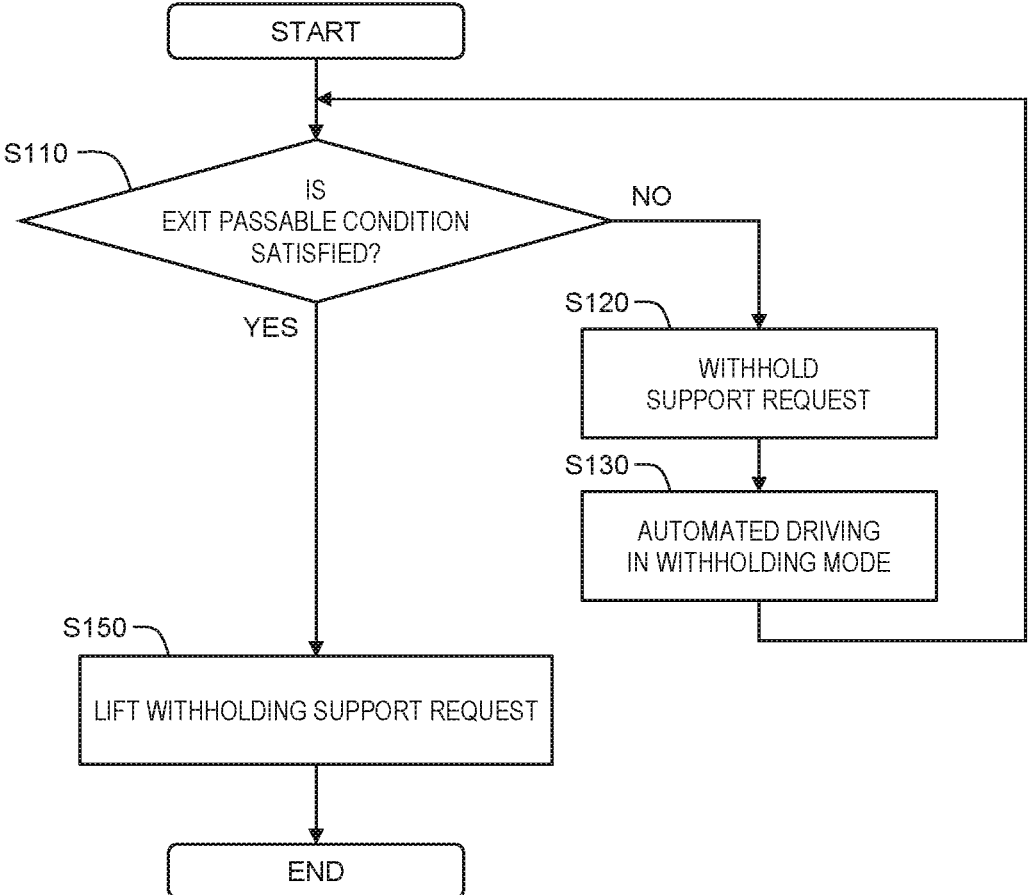
FIG. 18 is a flowchart showing a first example of processing related to support request withholding process according to an embodiment.

FIG. 18 is a flowchart showing a first example of processing related to the support request withholding process.

In Step S110, the control device 150 determines whether or not the exit passable condition is satisfied based on the surrounding situation information 183. The surrounding situation information 183 includes at least one of object information 184 and the signal indication information 186. For example, the exit passable condition includes the first exit passable condition under which the vehicle 100 is able to pass through the target exit EX without interfering with another object (see FIGS. 6 to 11). The control device 150 can determine whether or not the first exit passable condition is satisfied based on the object information 184. As another example, the exit passable condition may include the second exit passable condition under which the vehicle 100 is able to pass through the target exit EX in accordance with the signal indication (see FIGS. 12 to 14). The control device 150 can determine whether or not the second exit passable condition is satisfied based on the signal indication information 186.

When the exit passable condition is not satisfied (Step S110; No), the processing proceeds to Step S120. In Step S120, the control device 150 performs the "support request withholding process" that withholds the support request REQ without issuing it in the predetermined area AR. Further, the control device 150 performs the automatic driving control in a withholding mode (Step S130). For example, the control device 150 may make the vehicle 100 stop. In particular, when there is the intra-area interference, the control device 150 makes the vehicle 100 stop. When there is no intra-area interference, the control device 150 may make the vehicle 100 travel at a low speed to a position before the target exit EX. In either case, the control device 150 performs the automated driving control so as not to cause interference between the vehicle 100 and another object.

On the other hand, when the exit passable condition is satisfied (Step S110; Yes), the processing proceeds to Step S150. In Step S150, the control device 150 lifts (cancels) the support request withholding process. That is, the lifting condition is that "the exit passable condition is satisfied." The control device 150 withholds the support request REQ until the lifting condition is satisfied.

Figure 19:
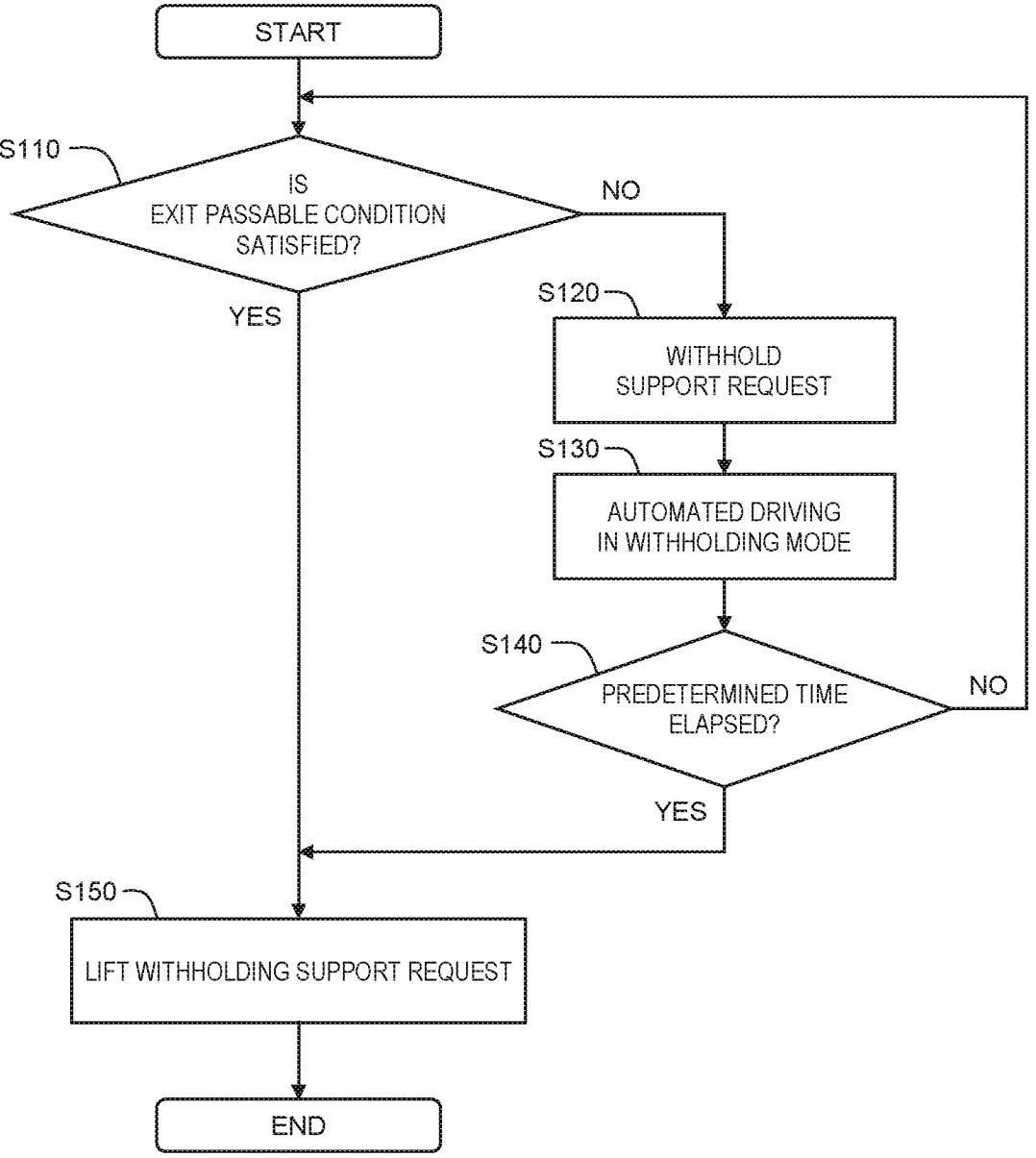
FIG. 19 is a flowchart showing a second example of processing related to support request withholding process according to an embodiment.

FIG. 19 is a flowchart showing a second example of the processing related to the support request withholding pro-cess. A description overlapping with the first example shown in FIG. 18 will be omitted as appropriate.

While withholding the support request REQ, the control device 150 determines whether or not a predetermined time has elapsed after the vehicle 100 enters the predetermined area AR (Step S140). In a case where the predetermined time has elapsed after the vehicle 100 enters the predetermined area AR (Step S140; Yes), the processing proceeds to Step S150. That is, the lifting condition may include that "a predetermined time elapses after the vehicle 100 enters the predetermined area AR." The control device 150 withholds the support request REQ until the lifting condition is satisfied.

In the case of the second example, the support request REQ may be issued after a certain period of time has elapsed regardless of the exit passable condition. Depending on the congestion situation in the vicinity of the target exit EX, the exit passable condition may not be satisfied for a long time. Even in such a case, the remote operator O is able to check the situation.

5. Effects

According to the present embodiment, as described above, it is determined whether or not the "exit passable condition" under which the vehicle 100 is able to pass through the target exit EX from the predetermined area AR without waiting is satisfied. When the exit passable condition is not satisfied, requesting the remote support in the predetermined area AR is withheld. This prevents the remote operator O from being unnecessarily assigned to the vehicle 100. In other words, the binding time of the remote operator O is prevented from becoming unnecessarily long.

According to the present embodiment, as described above, it is possible to prevent the remote operator O from being unnecessarily bound by the remote support of the vehicle 100 in the predetermined area AR. That is, it is possible to more efficiently assign the remote operator O. This may be desirable from the point of view of the operation of the remote support. For example, it is possible to reduce the operational costs of the remote support.

Furthermore, when the support request REQ is issued after the first exit passable condition is satisfied, the vehicle 100 does not interfere with another moving object when passing through the target exit EX. This makes it possible to beforehand prevent an erroneous operation by the remote operator O from occurring. For example, such an event that the remote operator O erroneously issues a start instruction even though the pedestrian 20 is present near the target exit EX can be prevented from occurring.

What is claimed is:

1. A vehicle control system for controlling a vehicle that requests remote support in a predetermined area, the vehicle control system comprising one or more processors configured to:

acquire surrounding situation information including object information regarding an object around the vehicle;

generate a target trajectory that penetrates the predetermined area, passes through a target exit, and extends to outside of the predetermined area;

determine whether an intra-area interference occurs based on the object information, the intra-area interference meaning that the vehicle traveling in accordance with the target trajectory interferes with the object around the vehicle in the predetermined area before passing through the target exit;

determine whether or not an exit passable condition is satisfied based on the surrounding situation information, the exit passable condition being a condition under which the vehicle traveling in accordance with the target trajectory is able to pass through the target exit to go out of the predetermined area without waiting;

upon determination that the exit passable condition is not satisfied, withhold requesting the remote support in the predetermined area regardless of presence or absence of the intra-area interference and perform automatic driving so as not to cause interference between the vehicle and the object around the vehicle until a lifting condition is satisfied;

upon determination that the exit passable condition is satisfied and the intra-area interference does not occur, continue the automatic driving without requesting the remote support; and upon determination that the exit passable condition is satisfied and the intra-area interference does occur, request the remote support.

2. The vehicle control system according to claim 1, wherein the exit passable condition includes a first exit passable condition under which the vehicle is able to pass through the target exit without interfering with the object around the vehicle, and the one or more processors determine whether or not the first exit passable condition is satisfied based on the object information.

3. The vehicle control system according to claim 2, wherein a target exit area is an area adjacent to the target exit and located outside the predetermined area, and the object information includes information on a preceding vehicle in the target exit area.

4. The vehicle control system according to claim 3, wherein when the preceding vehicle is present in the target exit area and the vehicle is not able to enter the target exit area, the one or more processors determine that the first exit passable condition is not satisfied.

5. The vehicle control system according to claim 3, wherein when the preceding vehicle is present in the target exit area but a speed of the preceding vehicle in the target exit area exceeds a speed threshold, the one or more processors determine that the first exit passable condition is satisfied.

6. The vehicle control system according to claim 2, wherein a pedestrian crossing is present near the target exit, the object around the vehicle is a moving object on the pedestrian crossing, and when the vehicle is predicted to interfere with the moving object on the pedestrian crossing when passing through the pedestrian crossing, the one or more processors determine that the first exit passable condition is not satisfied.

7. The vehicle control system according to claim 1, wherein the surrounding situation information further includes signal indication information indicating signal indication around the vehicle,

the exit passable condition includes a second exit passable condition under which the vehicle is able to pass through the target exit in accordance with the signal indication, and the one or more processors determine whether or not the second exit passable condition is satisfied based on the signal indication information.

8. The vehicle control system according to claim 7, wherein when the signal indication to be followed by the vehicle is a red light or a yellow light, the one or more processors determine that the second exit passable condition is not satisfied.

9. The vehicle control system according to claim 7, wherein when the signal indication to be followed by the vehicle is a green light but a remaining time of the green light is shorter than a time required for the vehicle to go out of the predetermined area, the one or more processors determine that the second exit passable condition is not satisfied.

10. The vehicle control system according to claim 1, wherein the lifting condition includes that the exit passable condition is satisfied.

11. The vehicle control system according to claim 1, wherein the lifting condition includes that a predetermined time elapses after the vehicle enters the predetermined area.

12. A vehicle control method for controlling a vehicle that requests remote support in a predetermined area, the vehicle control method comprising:

acquiring surrounding situation information including object information regarding an object around the vehicle;

generating a target trajectory that penetrates the predetermined area, passes through a target exit, and extends to outside of the predetermined area;

determining whether an intra-area interference occurs based on the object information, the intra-area interference meaning that the vehicle traveling in accordance with the target trajectory interferes with the object around the vehicle in the predetermined area before passing through the target exit;

determining whether or not an exit passable condition is satisfied based on the surrounding situation information, the exit passable condition being a condition under which the vehicle traveling in accordance with the target trajectory is able to pass through the target exit to go out of the predetermined area without waiting;

upon determination that the exit passable condition is not satisfied, withholding requesting the remote support in the predetermined area regardless of presence or absence of the intra-area interference and performing automatic driving so as not to cause interference between the vehicle and the object around the vehicle until a lifting condition is satisfied;

upon determination that the exit passable condition is satisfied and the intra-area interference does not occur, continuing the automatic driving without requesting the remote support; and upon determination that the exit passable condition is satisfied and the intra-area interference does occur, requesting the remote support.

13. A non-transitory computer-readable recording medium on which a vehicle control program for controlling a vehicle that requests remote support in a predetermined area is recorded, the vehicle control program, when executed by a computer, causing the computer to execute:

acquiring surrounding situation information including object information regarding an object around the vehicle;

generating a target trajectory that penetrates the predetermined area, passes through a target exit, and extends to outside of the predetermined area;

determining whether an intra-area interference occurs based on the object information, the intra-area interference meaning that the vehicle traveling in accordance with the target trajectory interferes with the object around the vehicle in the predetermined area before passing through the target exit;

determining whether or not an exit passable condition is satisfied based on the surrounding situation information, the exit passable condition being a condition under which the vehicle traveling in accordance with the target trajectory is able to pass through the target exit to go out of the predetermined area without waiting;

upon determination that the exit passable condition is not satisfied, withholding requesting the remote support in the predetermined area regardless of presence or absence of the intra-area interference and performing automatic driving so as not to cause interference between the vehicle and the object around the vehicle until a lifting condition is satisfied;

upon determination that the exit passable condition is satisfied and the intra-area interference does not occur, continuing the automatic driving without requesting the remote support; and upon determination that the exit passable condition is satisfied and the intra-area interference does occur, requesting the remote support.

* * * * *